(12) United States Patent
Dittmann et al.

(10) Patent No.: US 12,123,512 B2
(45) Date of Patent: Oct. 22, 2024

(54) HOUSING HAVING A BODY AND A DETACHABLY FIXED LID

(71) Applicant: Sartorius Stedim Systems GmbH, Guxhagen (DE)

(72) Inventors: Simon Dittmann, Goettingen (DE); Jan-Eike Schubert, Goettingen (DE); Michael Gohs, Goettingen (DE); Yannick Stapel, Goettingen (DE)

(73) Assignee: Sartorius Stedim Systems GmbH, Guxhagen (DE)

( * ) Notice: Subject to any disclaimer, the term of this patent is extended or adjusted under 35 U.S.C. 154(b) by 6 days.

(21) Appl. No.: 18/168,132

(22) Filed: Feb. 13, 2023

(65) Prior Publication Data

US 2023/0194011 A1 Jun. 22, 2023

Related U.S. Application Data

(63) Continuation of application No. PCT/EP2021/060389, filed on Apr. 21, 2021.

(30) Foreign Application Priority Data

Aug. 13, 2020 (DE) ...................... 10 2020 121 357.3

(51) Int. Cl.
*F16K 27/00* (2006.01)
*F16K 27/02* (2006.01)
*F16K 27/12* (2006.01)

(52) U.S. Cl.
CPC ........ *F16K 27/003* (2013.01); *F16K 27/0236* (2013.01); *F16K 27/12* (2013.01); *F16K 2200/30* (2021.08)

(58) Field of Classification Search
CPC .... F16K 27/003; F16K 27/0236; F16K 27/12; F16K 2200/30; F16K 7/065; F16K 7/063; E05C 19/006
See application file for complete search history.

(56) References Cited

U.S. PATENT DOCUMENTS

| | | |
|---|---|---|
| 5,732,994 A | 3/1998 | Stancu et al. |
| 2002/0101141 A1 | 8/2002 | Leccia et al. |

(Continued)

FOREIGN PATENT DOCUMENTS

| | | |
|---|---|---|
| AT | 248146 B | 7/1966 |
| CH | 436076 A | 5/1967 |

(Continued)

OTHER PUBLICATIONS

International Preliminary report on Patentability, PCT/EP2021/060389, May 18, 2023, 7 pages.

(Continued)

*Primary Examiner* — John Bastianelli
(74) *Attorney, Agent, or Firm* — Edell, Shapiro & Finnan, LLC

(57) ABSTRACT

A housing having a housing body (100) carries on the outside of one of the side walls (110) a bolt (500) aligned parallel to the lid guide grooves (120) and the lid (200) carries a sleeve (222) fixed to a tab (220) projecting over the upper edge of the corresponding side wall (110) of the housing body (100) and aligned coaxially with the bolt (500). The sleeve (222) engages around the bolt (500) to form an axially and rotationally movable sliding bearing.

11 Claims, 7 Drawing Sheets

(56) References Cited

U.S. PATENT DOCUMENTS

2015/0091421 A1* 4/2015 Van Loon ............... A47B 69/00
                                                    312/249.8
2015/0202552 A1* 7/2015 Allott ................... B01D 35/005
                                                    210/171

FOREIGN PATENT DOCUMENTS

| CN | 108050268 A   | 5/2018  |
|----|---------------|---------|
| DE | 2329263 A1    | 12/1974 |
| DE | 9303033 U1    | 4/1993  |
| EP | 0429813 A1    | 6/1991  |
| EP | 0637707 A1    | 2/1995  |
| EP | 2841670 A1    | 3/2015  |
| EP | 2966326 A2    | 1/2016  |
| GB | 511435 A      | 8/1939  |
| WO | 2013162364 A1 | 10/2013 |

OTHER PUBLICATIONS

International Search Report, PCT/EP2021/060389, Aug. 13, 2021, 3 pages.

* cited by examiner

HOUSING HAVING A BODY AND A DETACHABLY FIXED LID

CROSS-REFERENCE TO RELATED APPLICATION

This is a Continuation of International Application PCT/EP2021/060389, which has an international filing date of Apr. 21, 2021, and the disclosure of which is incorporated in its entirety into the present Continuation by reference. This Continuation also claims foreign priority under 35 U.S.C. § 119(a)-(d) to and also incorporates by reference, in its entirety, German Patent Application DE 10 2020 121 357.3 filed on Aug. 13, 2020.

FIELD OF INVENTION

The invention relates to a housing comprising a housing body with an upper opening and two opposing side walls laterally bounding the opening with their upper edges, the inner sides of which walls each carry a longitudinally extending lid guide groove close to the upper edge, and a plate-like lid with lateral, longitudinally extending guide edges, the lid slidably mounted on the housing body by engagement of said guide edges in the lid guide grooves of the housing body.

BACKGROUND

Such housings with sliding lids are known to one skilled in the art from a wide range of applications. For example, CH 43 60 76 A discloses a game magazine of this type. AT 24 81 46 B1 discloses the same sliding lid principle in a so-called diapositive magazine, i.e. a storage box for diapositives. Finally, DE 93 030 33 U1 discloses a food warming device the body corpus and upper support plate of which can also be described as a generic housing.

In the context of the particularly preferred application, also in the context of the present invention, as a closure of a valve housing for a pinch valve, this design form of a housing with a sliding lid has particular advantages. Frequently, a pinch valve comprises a hose guide penetrating a housing body, into which a media-conducting hose can be inserted. To insert the hose, the lid, which closes the top of the housing body, must be opened. In the closed state, the lid also forms an abutment against which the hose is pressed when an opposing clamping member, which can be displaced in the radial direction, is advanced. The lid acting as an abutment must absorb comparatively high forces in the normal direction. When the lid is designed as a sliding lid, these forces are introduced into the housing body via the lateral guide edges of the lid and the corresponding lid guide grooves of the housing body, wherein the comparatively large interaction surface between guide edges and lid guide grooves enables uniform pressure distribution without pressure peaks. As a result, tilting, wear, etc. are reliably avoided. This applies in particular in comparison with a hinged lid articulated to the housing body through a hinge, which must be fixed to the housing body in the closed position with a latch attached to its free side edge. The aforementioned normal forces on the lid are introduced into the housing lid solely via said latch, whereby the latch is subject to significant force peaks. In addition, it is not always readily apparent whether such a closure is correctly closed, so that there is a risk of levering the incompletely closed lid open and the hose out of the housing when the pinch valve is actuated.

While a sliding lid may be advantageous in terms of secure closure of the pinch valve, it is disadvantageous in terms of manageability. It is often difficult to precisely insert the lid with its guide edges into the lid guide grooves of the housing body for reclosing the housing. This is all the more so the closer the guide edges engage in the lid guide grooves to prevent play in the normal direction. In addition, a conventional sliding lid has the disadvantage of becoming lost or confused with other lids when several pinch valves are arranged in close proximity to each other in a complex media control system. Finally, in order to be able to insert a hose into the housing body, the conventional sliding lid must be completely removed, which requires a clearance of at least the lid length in the longitudinal direction adjacent to the housing body.

SUMMARY

It is an object of the present invention to refine a known housing, in particular a housing of a pinch valve, such that safety and manageability are improved.

According to one formulation, this object is achieved in conjunction with features of housings known from the art, in that the housing body carries on the outside of one of the side walls a bolt aligned parallel to the lid guide grooves and the lid carries a sleeve fixed to a tab projecting over the upper edge of the corresponding side wall of the housing body and aligned coaxially with the bolt, the sleeve engaging around the bolt to form an axially and rotationally movable sliding bearing.

One salient aspect of the invention is to use the approach of the sliding lid as the actual closure mechanism for the lid, but at the same time to provide a hinge-like linkage of the lid to the housing body in the manner of a hinged lid, which ensures the captivity of the lid and at the same time reduces its degrees of freedom of positioning and alignment in such a way that the correct insertion of the guiding edges of the lid into the lid guiding grooves of the housing body is facilitated. Thus, the advantages of a sliding lid and those of a hinged lid are combined; their respective disadvantages, on the other hand, are cancelled out. In the open state, the lid behaves essentially like a hinged lid; in the closed state, or the state immediately preceding closing, on the other hand, the lid behaves like a sliding lid. In particular, any normal force exerted on the closed lid when the pinch valve is actuated is introduced into the housing body solely via the interaction surfaces of the guide edges and lid guide grooves. The hinge mechanism remains completely free of forces. When the lid is opened, i.e. when it is moved longitudinally out of the closed position guided by the edge/groove interaction, the sleeve slides on the bolt in the axial direction of the bolt without any forces. Only when the lid guide grooves of the housing body and the guide edges of the lid disengage from each other do the bolt and sleeve act together as a pivot bearing, which allows the lid to be pivoted and thus the opening of the housing body to be released without the lid being mechanically separated from the housing body. In this opened state, the hose can be inserted and removed or exchanged. For closing, the lid is folded back in its displaced position, with the sleeve/bolt connection initially serving as a pivot bearing and, in the fully folded state, also as an axial guide by which the guide edges of the lid can be correctly inserted into the lid guide grooves of the housing body at the correct height and without tilting. As soon as the lid guide grooves and guide edges are engaged with each other, the sleeve/bolt connection again becomes ineffective and the lid essentially functions again as a pure sliding lid.

As explained at the beginning, one disadvantage of conventional sliding lids is their large space requirement in the longitudinal direction. In order to alleviate this problem, in a further refinement of the invention it is provided that the guiding edges of the lid as well as the lid guiding grooves of the housing body each consist of sections spaced apart from each other in the longitudinal direction, which are coordinated with each other in such a way that at least one sliding position of the lid exists in which the sections of its guiding edges are in intermittent arrangement with the sections of the lid guiding grooves of the housing body, the sections of both types, i.e. the guiding edge sections on the one hand and the lid guiding groove sections on the other hand, being out of engagement with each other. This corresponds essentially to a comb-like configuration of the guide edges on the one hand and at least the upper groove edges of the lid guide grooves on the other hand. The lower groove walls of the lid guide grooves, i.e. those located in the interior of the housing, can, on the other hand, be of continuous and uninterrupted design. They are even advantageously so in order to provide a flat, uninterrupted bearing surface for the guiding edges of the lid. Out of engagement with each other are such sectionally designed guide edges and guide grooves when the "prongs" of their respective "combs" are "in gap" with each other. In such a state, the sliding lid can be lifted off the housing body or, in accordance with the invention, folded away from it. The displacement in the longitudinal direction required for this depends on the special coordination of the groove sections and edge sections and their gaps, but is in any case less than the complete lid length by which the lid would have to be displaced without such a sectional design of guide grooves and guide edges.

As explained, the linkage of the lever via its sleeve and the bolt on the housing body serves, among other things, to ensure that the lid cannot be lost. However, situations are conceivable in which separation of the lid from the housing body appears to be entirely desirable. For example, pinch valves are conceivable the housings of which can be equipped with different hose guides and different clamping members for adaptation to different hose sizes. Such an exchange of hose guide and clamping member may also necessitate the exchange of the abutment against which the hose is pressed via the clamping member. As already explained at the beginning, the lid regularly forms the abutment, for which it has specially shaped abutment areas. If these abutment areas are not interchangeably fixed to the rest of the cover, but are an integral part of the cover, the entire lid must be replaced in order to replace the abutment. To facilitate this, in an advantageous embodiment of the invention it is provided that the bolt is detachably fixed to the housing body. In particular, it can be provided that the bolt is mounted in two eyes which are arranged at a distance from one another in the longitudinal direction on the outside of the associated side wall of the housing body. At least one of these eyes, which shall be referred to here as the first eye or also input-side eye, is formed as a through-opening. The bolt, which is preferably round in cross-section, can be pushed through this through-opening and inserted into the spaced, second eye. This is preferably done when the sliding lid is closed, i.e. when the lid is already fixed to the housing body via the interaction between the lid guide grooves of the housing body and the guide edges of the lid in such a way that the sleeve is aligned coaxially with the bolt bearing eyes so that the bolt can be pushed through the sleeve at the same time as it is pushed into the eyes. To replace the cover, the bolt is pulled out of the sleeve and out of the eyes in the reverse manner and the lid can be completely removed after sliding open.

For reasons explained in more detail below, it is considered particularly advantageous if the second eye is designed as a blind opening through which the bolt cannot be pushed, but into which it can only be pushed against a stop. The bolt at its end nearest the second eye and/or the blind opening may have a spring-biased stop element that can be displaced in the axial direction of the bolt. This spring-biased stop element counteracts the insertion of the bolt into the second eye.

In principle, axial fixation of the bolt is not necessary because, as already explained above, it does not actually have to absorb any axial forces during intended operation. However, permanent vibrations or improper handling can still lead to longitudinal displacement of the bolt, which can then result in undesired opening of the hinge formed by the bolt together with the sleeve. Axial fixation of the bolt is therefore desirable. This is supported, as provided in a preferred further development of the invention, if the bolt has a radial projection, i.e. a radially extended projection, in the region of its bearing in the first eye and the first eye has on its inner side a corresponding first groove which extends in the axial direction of the bolt and whose end face facing away from the second eye is open. In other words, a longitudinally extended groove which is open on the input side is provided on the inner side of the first eye. When the bolt is pushed through the first eye, said radial projection can engage in this groove.

In one feasible embodiment of the invention, said groove is closed on the outlet side of the first eye and has a kink inside the first eye. In order for the radial projection engaging in the first groove to pass through the kink, a corresponding rotation of the bolt during insertion is required so that the bolt is locked in the angled groove in the first eye in the manner of a carabiner lock.

However, the formation of kinked grooves in inner walls of openings of comparatively small diameter is technically complex. In a preferred alternative, it is therefore provided that both end faces of the first groove are open so that the bolt can be pushed in so far that its radial projection passes completely through the first groove, which is designed as a through groove, and is positioned in the area between the two eyes. Rotation of the bolt in this axial position prevents the bolt from being pulled out, since the radial projection then abuts against the axially inner edge of the first eye. This embodiment is preferably implemented together with the above-mentioned spring-loaded stop element at the distal end of the bolt or in the second eye. With appropriate dimensioning, in fact, a compression of the spring is required to allow the radial protrusion to pass completely through the first groove. After subsequent rotation of the bolt, the radial projection is pressed against the axially inner edge of the first eye by the spring force of the stop element.

In order to further improve this axial securing, in a particularly preferred embodiment of the invention it can be provided that the first eye has on its inner side a second groove which is offset from the first groove, extends in the axial direction of the bolt and also corresponds to the projection of the bolt, and whose end face facing the second eye is open and whose end face facing away from the second eye is closed. In other words, the second groove is designed as an axially inwardly open blind groove. In such an embodiment, if the rotation of the bolt occurs to such an extent that the radial projection comes to lie in front of the entrance of the second groove, it is pressed into this second groove and against its closed end face by the spring force of the stop element, the interaction between the groove walls and the radial projection causing the bolt to be secured against rotation. In other words, in this situation it is impossible for the bolt to be inadvertently twisted in such a way that the radial projection would reach the axially inner entrance of the first groove and could migrate in the axial direction. Instead, a force in the axial direction of insertion is required to free the radial stop from the second groove, followed by a rotation of the bolt to such an extent that the radial projection comes to rest at the axially inner entrance of the first groove, and further followed by an axial extraction of the bolt from the eyes. This complex operation is easy to perform, but not unintentionally and certainly not accidentally, for example, due to vibration. In order to facilitate this handling, it is preferably provided that the bolt has a radially projecting actuating lever in its end region axially in front of the first eye. The required axial and rotational forces can be introduced via this lever.

In order to ensure that the lid can also be axially fixed in its closed position, it is preferred that the lid and the housing body have corresponding elements of a ball detent mechanism which interact with each other in the closed position of the lid to implement a detachable safeguard against longitudinal displacement between the lid and the housing body. Preferably, spring-biased, rounded latching elements, e.g. balls or ball-head bolts, mounted on the housing body project into the travel path of the lid and, due to their rounded shape, are pressed into their seat in the housing body against their spring biasing force when the lid passes over them. The locking position of the lid is characterized, among other things, by the fact that corresponding recesses in the running surfaces of the lid reach the location of said spring-biased latching elements so that they engage in said recesses in a spring-driven manner. This ensures that the lid is locked. However, this can be overcome in an analogous manner by applying appropriate force during axial displacement. In addition, this spring bias presses the guide edges of the lid on one side against one of the groove walls of the lid guide grooves, thus counteracting a corresponding play. The lid guide grooves can therefore be dimensioned comparatively wide relative to the guide edges, which in turn facilitates insertion of the latter into the former. Of course, the reverse arrangement is also possible, in which the spring-loaded detent elements are part of the lid and the corresponding detent recesses are part of the housing body.

BRIEF DESCRIPTION OF THE DRAWINGS

Further details and advantages of the invention will be apparent from the following specific description and drawings, which show, in.

DETAILED DESCRIPTION

Identical reference signs in the figures indicate identical or analogous elements.

Figure 1:
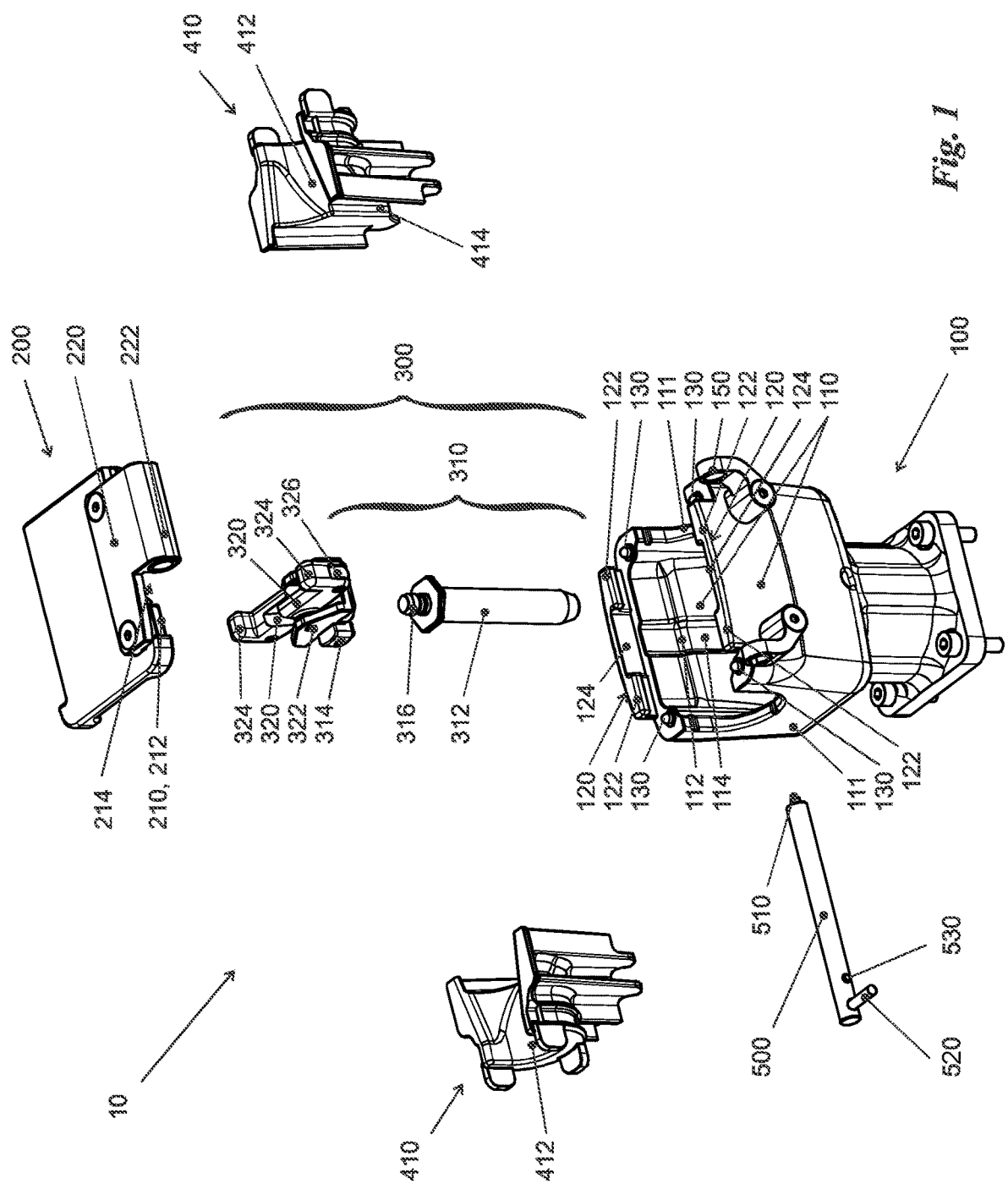
FIG. 1: An exploded view of a pinch valve according to one embodiment of the invention.

FIG. 1 shows an exploded view of a pinch valve 10 according to the present invention. The pinch valve 10 comprises a housing body 100 having longitudinally extending side walls 110 and end walls 111 provided with U-shaped recesses.

At their upper edges, the side walls 110 of the housing body 100 each carry a lid guide groove 120, which in the illustrated embodiment are formed as two sections 122 spaced apart by a gap 124.

At a central position, the inner sides of each of the side walls 110 of the housing body 100 include a vertically extending first clamping member guide groove 114 that shows a longitudinally extending step 112. The function of the step 112 will be discussed in further detail below in the context of FIGS. 3 and 4, each of which shows a sectional view through the pinch valve 10 in the plane of the first clamping member guide grooves.

Housing inserts 410 can be inserted into the cavity of the housing body 100, which have sections of a round bottom groove 412 and, together with the recesses of the end walls 111 of the housing body 100, form a hose guide 400 for a not shown, longitudinally extended, media-conducting, flexible hose. This hose guide 400 is particularly well recognizable in the illustration of FIG. 5. At their mutually facing end faces, the housing inserts 410 each have a vertically extending, clamping member guide groove 414, the function of which will be discussed in more detail below.

Figure 6:
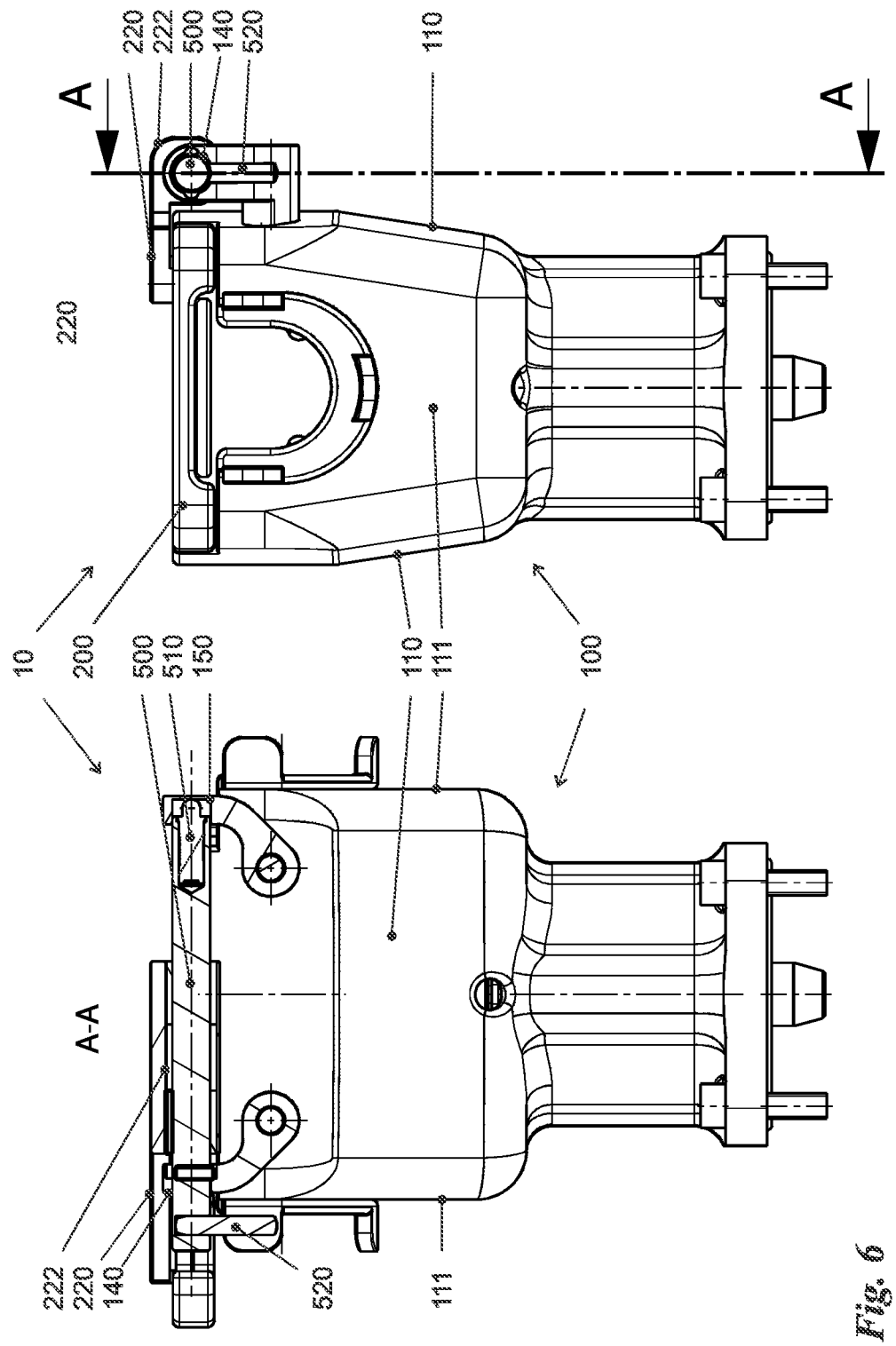
FIG. 6: a sectional view of the body of the pinch valve of FIG. 1 and FIG. 7: a sectional view of the body of the pinch valve of FIG. 1 without the pin.

One of the side walls 110 of the housing body 100 carries on its outer surface a first eye 140 and a second eye 150, which are formed and aligned longitudinally spaced from each other such that a bolt 500 can be inserted therein to undergo axial and rotational slide bearing. In the illustrated embodiment, the first eye 140 is formed as a through opening, and the second eye 150 is formed as a blind opening. In the illustrated embodiment, the bolt 500 has a spring biased stop element 510 at its distal end and an actuating lever 520 at its proximal end. In addition, in the illustrated embodiment, the bolt 500 has a radial projection 530 between its two ends in close proximity to the actuating lever 520. These elements and their function will be discussed in more detail below in the context of FIGS. 6 and 7.

Further, the pinch valve 10 includes a lid 200 having longitudinal sides each provided with a guide edge 210. In the embodiment shown, the guide edges 210 are each divided into two sections 212 that are spaced apart by a gap 214. These relationships are particularly evident in FIG. 5. In operation, the guide edges 210 interact with the lid guide grooves 120 of the housing body 100. In this case, the guide edges 210 can be inserted into the lid guide grooves 120, so that the aforementioned elements together form a displaceable slide bearing of the lid 200 on the housing body 100. Thus, by longitudinally displacing the lid 200, the housing body 100 which is open at the top can be closed or opened according to the principle of the sliding lid. The closed sliding position of the lid is defined by four spring-biased ball head pins 130, which are provided in the running surfaces of the housing body 100 and engage in corresponding latching recesses 230 in the underside of the lid 200. These latching recesses 230 can be seen in FIG. 5. The sections 122 and the gap 124 of the lid guide grooves 120 of the housing body 100 are adapted to the corresponding sections 212 and the gap 214 of the guide edges 210 of the lid 200 in such a way that at least one sliding position of the lid exists in which two mutually opposite sections 212 of the guide edges 210 of the lid 200 come to lie in the mutually opposite gaps 124 of the lid guide grooves 120 of the housing body 100, so that the lid 200 can be lifted vertically from the housing body 100 or can be pivoted away from the latter about a pivot axis lying parallel to its side walls.

Figure 2:
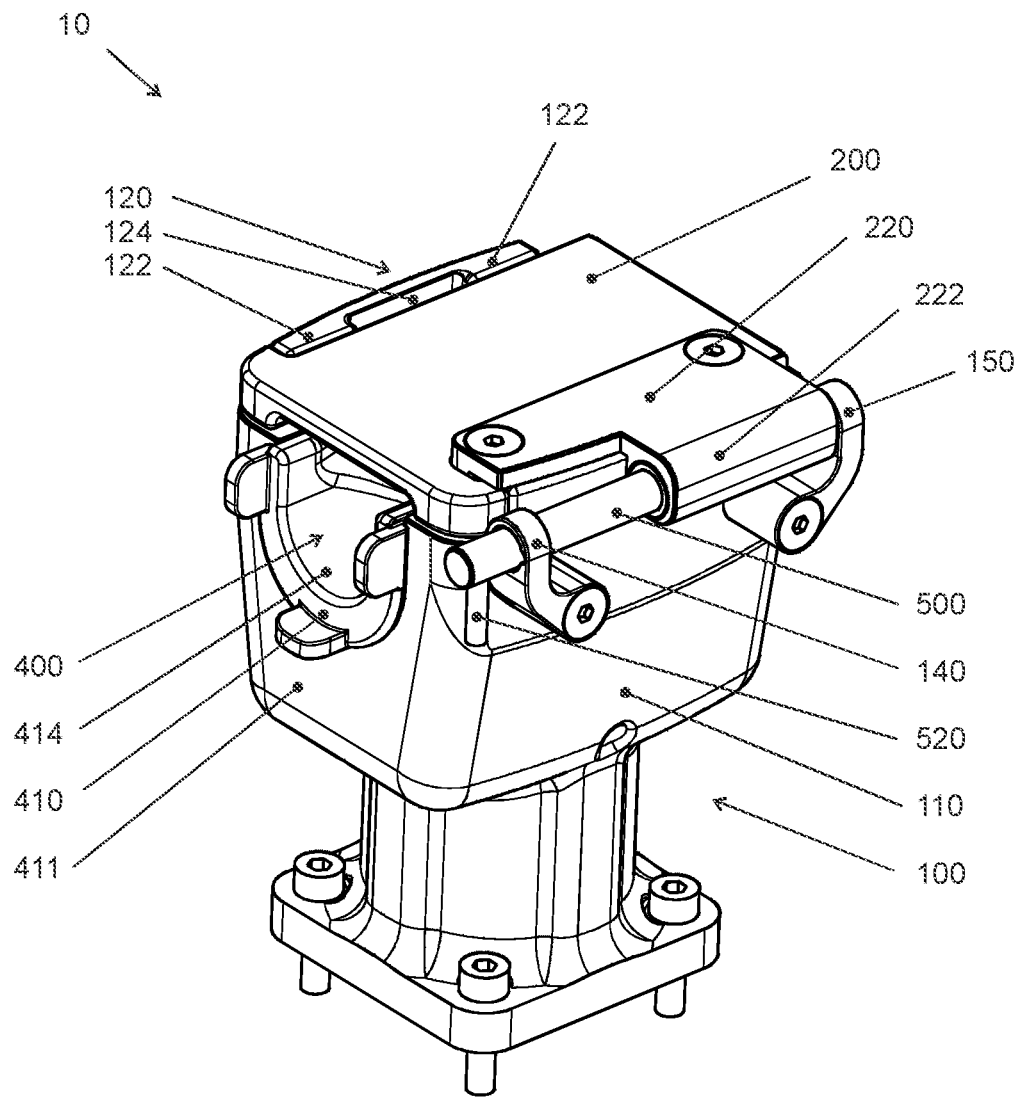
FIG. 2: A perspective view of the pinch valve of FIG. 1 in the assembled state with the lid closed.
Figure 5:
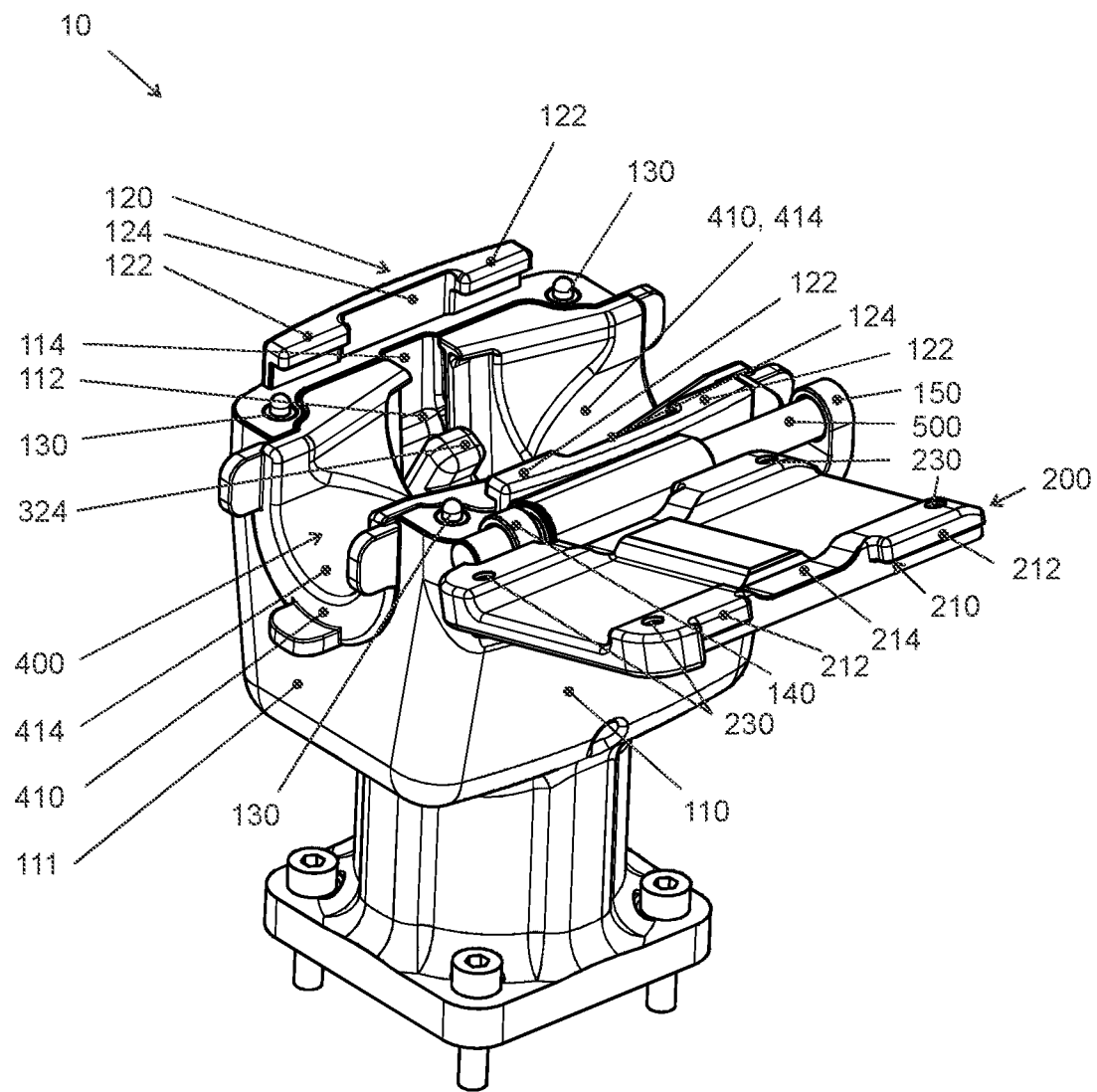
FIG. 5: A perspective view of the pinch valve of FIG. 1 in the assembled state with the lid open.

To provide such a pivot axis, the lid 200 has a tab 220 which laterally overhangs one of its guide edges 210. At its laterally outer end, the tab 220 carries a sleeve 222 which, in the assembled state of the housing, as can be seen in particular in FIGS. 2 and 5, is aligned with the eyes 140, 150 and the bolt 500 inserted therein, so that the bolt 500 together with the sleeve 222 forms an axial and rotational pivot bearing for the sleeve 222 and thus for the lid 200. It should be noted that the length of the sleeve 222 is dimensioned to be shorter than the distance between the two eyes 140, 150, so that axial displacement of the lid 200 relative to the housing body 100 is possible; in particular, when the guide edges 210 of the lid are in engagement with the lid guide grooves 120 of the housing body 100.

FIG. 1 further shows a clamping member 300 comprising a plunger 310 and two clamping jaws 320. In the embodiment shown, the plunger 310 is formed in two parts, namely with a plunger shaft 312 and a plunger tip 314, which carries an articulation 322 for the clamping jaws 320. The clamping jaws 320 are claw-like in shape and each have bent-up claw ends 324 at their tips. At the bend point of the claw ends 324, the clamping jaws 320 each have a contact roller 326 on their outer sides for interaction with the first clamping member guide grooves 114 of the housing body 100, which will be discussed in more detail below.

Figure 3:
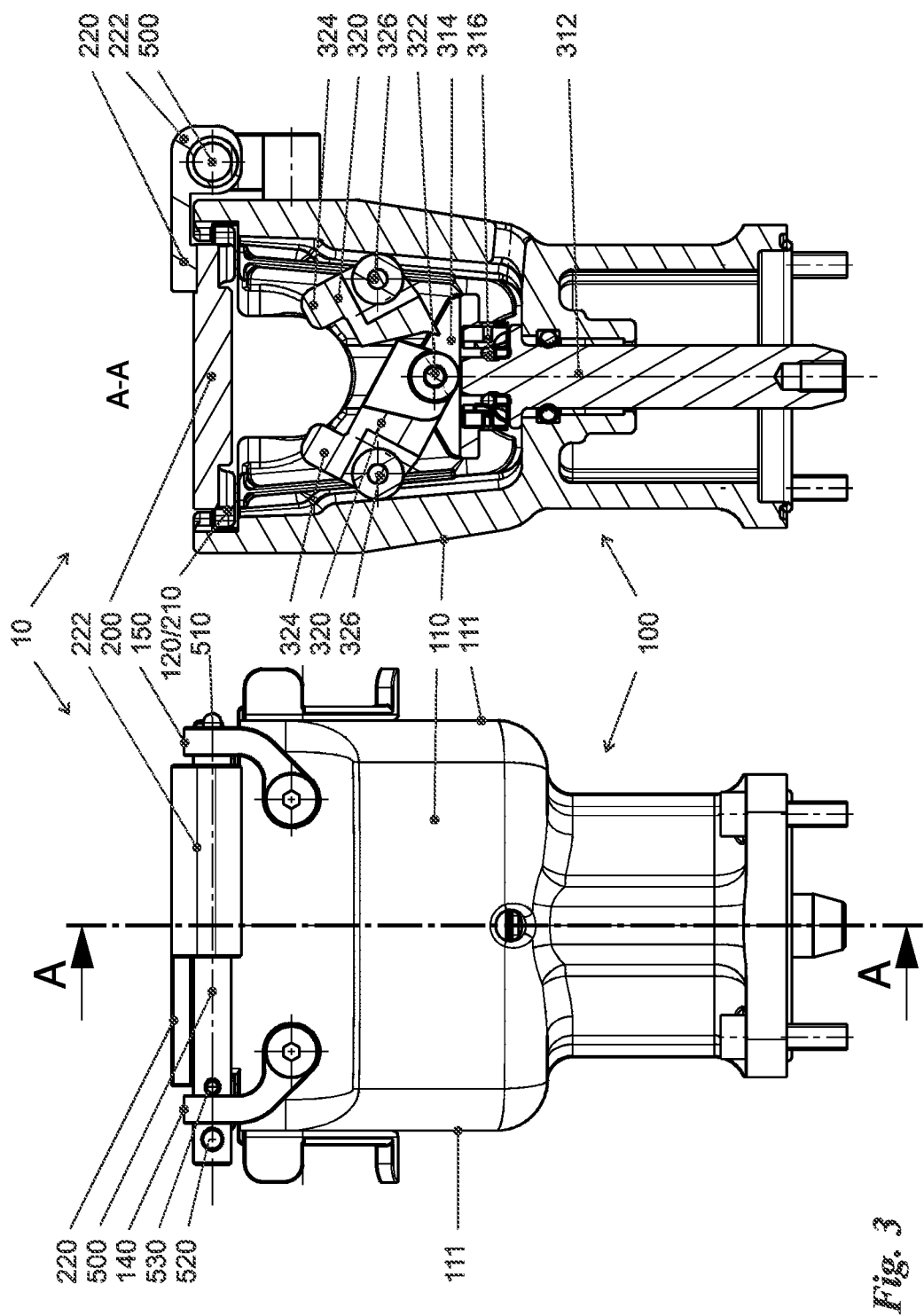
FIG. 3: A sectional view through the pinch valve of FIG. 2 in the open valve state.
Figure 4:
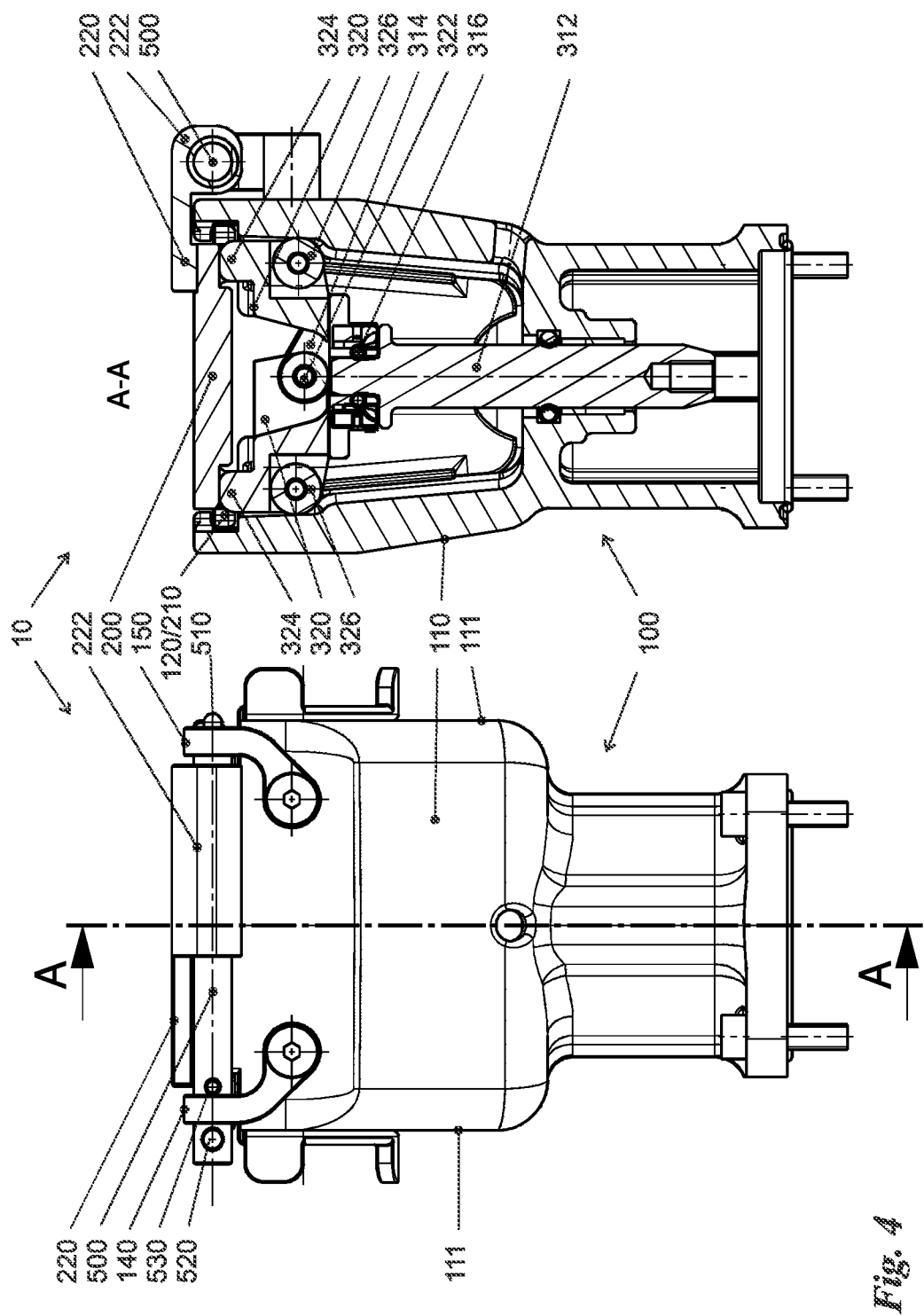
FIG. 4: A sectional view through the pinch valve of FIG. 2 in the closed valve state.

The plunger shaft 312 and the plunger tip 314 are releasably connected to each other through a ball latch mechanism 316, which is more particularly visible in the sectional view of FIGS. 3 and 4.

FIG. 2 shows the pinch valve 10 in the assembled state with the lid 200 closed. FIGS. 3 and 4 each show a sectional view of the pinch valve 10 of FIG. 2 in the valve open position (FIG. 3) and valve closed position (FIG. 4). The sectional planes A-A in FIGS. 3 and 4 are each marked in the auxiliary drawing shown to the left of the sectional view. It can be seen that the cut is transverse to the longitudinal direction of the pinch valve 10, i.e. transverse to the hose guide direction and centered so that the sectional plane is exactly centered on the first clamping member guide grooves 114. Due to the step 112, the channel formed between the side walls is narrower in its lower region than in its upper region. In the valve-open position, i.e. the retracted position of the clamping member 300 shown in FIG. 3, the clamping jaws 320 are located in the lower, narrower channel region. They bear with their contact rollers 326 against the groove base of the first clamping member guide grooves 312. As can be seen in FIG. 3, the relative dimensioning is such that the clamping mouth formed by the clamping jaws 320 is not completely open. Nevertheless, the clearance above the clamping mouth to the underside of the lid 200 is large enough to position a flexible, media-conducting hose in the hose guide 400; in particular, by inserting the hose into the round bottom grooves 412 of the housing inserts 410.

In order to close the valve, the clamping member 300 is advanced toward the lid so that the mouth base presses the hose against the lid 200, which acts as an abutment, narrowing or completely closing the lumen of the hose. During the advance of the plunger 310, the contact rollers 326 pass over the step 112 and thus enter the upper, wider channel region in which the clamping mouth can open completely. This opening of the clamping mouth is forced by the elasticity of the hose counteracting the plunger advance.

When the valve is to be reopened, the plunger is retracted. The contact rollers 326 again overcome the step 112, so that the clamping jaws 320 are pivoted towards each other by the smaller distance of the side walls 110 in the lower channel area, so that the clamping mouth partially closes again in the process. Here, the claw ends 324 press from laterally outside on the folded areas of the not yet fully opened hose and thus support the re-opening of its lumen even in cases where the inherent elasticity of the hose is not sufficient, for example due to an adhesion of the hose's inner walls to each other. The constrictive guidance of the clamping jaws 320 brought about by the step 112 in interaction with the contact rollers 326 represents a mechanically simple, very robust way of reliably coercing the immediate, complete re-opening of the hose lumen when the pinch valve 10 is opened. The arrangement of the step 112 in the first clamping member guide grooves 114 is not mandatory for functionality, but is advantageous in that it prevents rotation of the pinch member 300 about its plunger axis. The second clamping member guide grooves 114 in the opposing sides of the housing inserts 410 of the hose guide 400 represent a further measure for preventing such rotation. They interact with longitudinal projections of the plunger tip 314, which can be seen in FIG. 1 without any particular reference sign.

To replace the hose and/or the housing inserts and/or the clamping member and/or parts thereof, the lid 200 must be opened. As explained above, the closed position of the lid shown in FIG. 2 is defined by the latching engagement of the spring-biased ball head pins 130 of the housing body 100 in the corresponding latching recesses 230 of the lid 200. Furthermore, in this closed position, the guide edges 210 of the lid 200 are guided in the corresponding lid guide grooves 120 of the housing body 100. This means that the portions 212 of the guide edges 210 of the lid 200 are colocated with the corresponding portions 122 of the lid guide grooves 120 of the housing body 100. Vertical lifting or pivoting of the lid is not possible in this condition. Due to the spring biased ball head latching mechanism 130/230, the lid 200 is fixed in this position with no vertical or horizontal play. The sleeve 222, which coaxially grips the pin 500, does not have to support any forces in this position.

Longitudinal displacement of the lid is possible by applying a longitudinal force overcoming the latching mechanism 130/230. The sleeve 222 is thereby displaced longitudinally, i.e. in the axial direction of the bolt, on the bolt mounted in the eyes 140, 150—still without force. In a sliding position, in which the sections 212 of the guiding edge 210 of the lid 200 come into gap with the sections 122 of the lid guiding grooves 120 of the housing body 100, lifting or pivoting of the lid becomes possible, the spring bias of the ball head pins 130 pushing up the lid when this sliding position is reached and thus marking the sliding position in a recognizable manner. In this condition, the sleeve 222 together with the pin 500 can act as a pivot bearing for the lid 200 so that it can be moved to the swung open position shown in FIG. 5. In this position, the interior of the housing body 100 is accessible—in particular for the purpose of replacing the hose, housing inserts 410 and/or clamping member 300 or parts thereof.

The lid 200 can be closed in the reverse order, wherein the axial guide implemented by the sleeve 222 and the pin 500 enables the guide edges 210 of the lid 200 to be inserted into the lid guide grooves 120 of the housing body 100 securely and without tilting.

Figure 7:
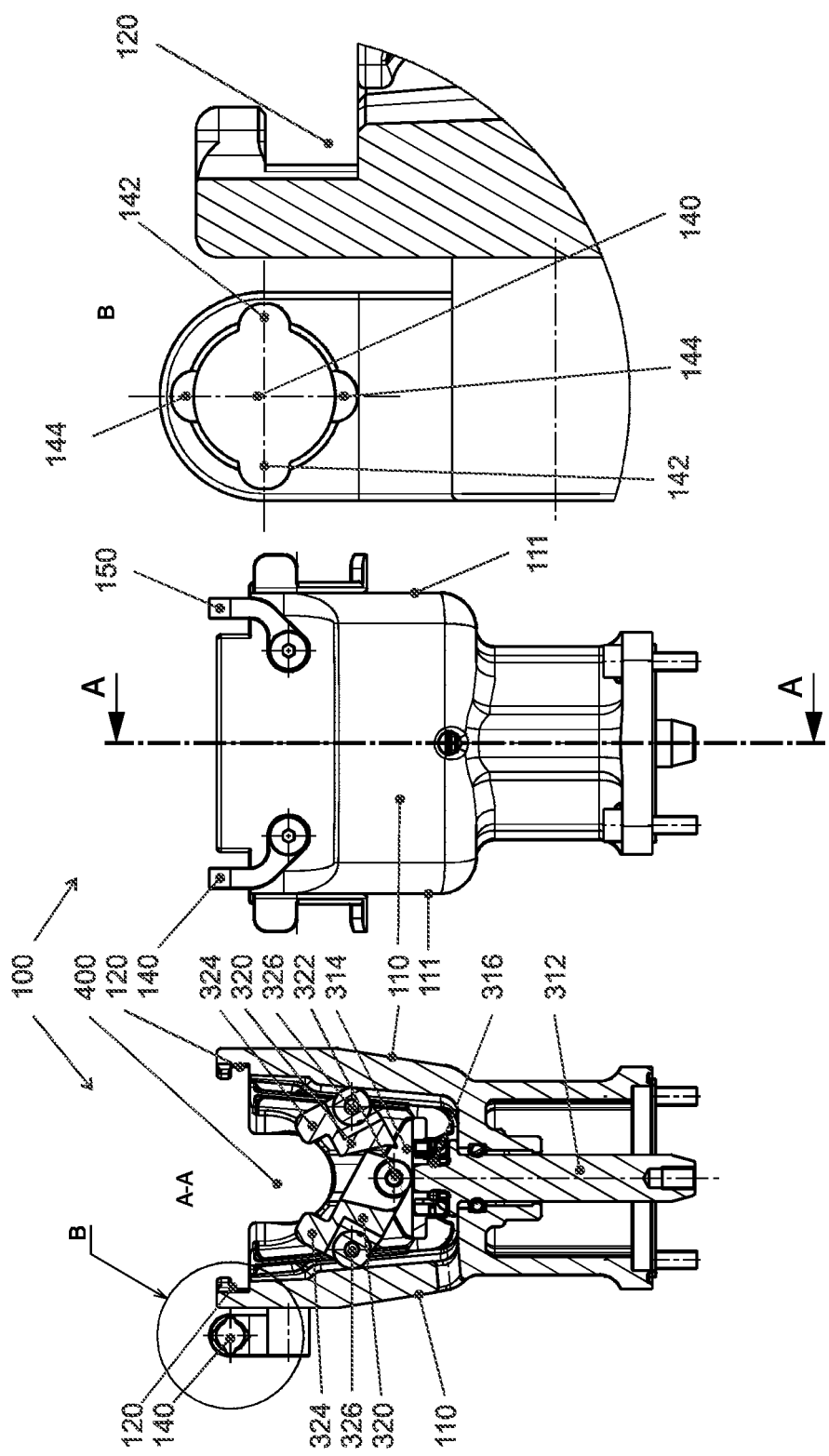

As mentioned, the interaction between sleeve 222 and bolt 500 is essentially free of axial forces. However, this is an idealized assumption. In practice, axial forces acting on the bolt 500 may arise, in particular due to permanent vibrations. Therefore, in the embodiment shown, an axial fixation of the bolt is provided which at the same time allows removal of the bolt for the purpose of complete removal of the lid 200. For illustration purposes, reference is made to FIGS. 6 and 7, which show different sectional views along sectional planes A-A, as indicated in the auxiliary drawings shown to the right of the respective sectional view. FIG. 7 also shows an enlarged view of section B of the corresponding sectional drawing.

As can be seen in said magnified view of the first eye 140 in FIG. 7, the first eye 140, which is designed as a through opening, carries a first groove 142, which is designed as a passage groove passing through the eye in the longitudinal direction. At an angular distance of 90°, a second groove 144 is arranged, which is formed as a longitudinally extending blind groove, the end face of which facing the second eye 150 is open. When the bolt 500 is inserted into the first eye, it is aligned with the aid of the actuating lever 520 so that its radial projection 530 is inserted into the first groove 242. The bolt is advanced so far that the radial protrusion 530 completely crosses the first groove 142 and comes to rest between the two eyes 140, 150. In particular, in the last phase, this movement takes place against the spring force of the spring-biased stop element 510, which in this phase strikes against the closed rear wall of the second eye 150 formed as a blind opening. Subsequently, the bolt is rotated by 90° with the actuating lever 520 so that its radial projection 530 comes to lie in front of the entrance of the second groove 144. Due to the spring force of the stop element 510, the bolt 500 is pressed into the second groove 144 formed as a blind groove when the actuating member 520 is released, this backward movement of the bolt 500 ending at the closed end of the second groove 144 when the radial projection 530 stops. The bolt 500 is dimensioned in such a way that its distal end does not yet come free from the second eye 150, which is formed as a blind opening. The bolt 500 is thus secured axially and rotationally.

Removal of the bolt 500 requires pressure on its proximal end so that its radial projection 530 comes free from the blind groove 144 against the spring force of the stop element 510. Rotation of the bolt 500 by 90° then repositions its radial protrusion 530 in front of the passage groove 142, allowing the entire bolt to be pulled out of the two eyes 140, 150. In the embodiment shown, the first and second grooves 142, 144 are each formed in duplicate, so that the respective direction of rotation of the bolt during locking or unlocking is irrelevant.

The skilled person will understand that the isolated fixing and removal of the bolt 500 described above hardly plays a role in practice. More important is the articulation of the lid 200 with the bolt 500. The process described above is thus generally carried out with the lid 200 in the closed position, so that the bolt 500 can coaxially pass through the sleeve 222, which is then already positioned in a well-defined manner.

The embodiments discussed in the specific description and shown in the figures are only illustrative examples of embodiments of the present invention. Based on the disclosure set forth herein, those skilled in the art is provided with a wide range of possible variations to the structures and methods exemplarily discussed. The applicant seeks to cover also any changes and modifications as fall within the spirit and scope of the invention, as defined by the appended claims, and equivalents thereof.

LIST OF REFERENCE SIGNS 10 pinch valve
100 housing body
110 side wall
111 end wall
112 step
114 first clamping member guide groove
120 lid guide groove
122 section of 120
124 gap between 122
130 ball head pin
140 first eye
142 passage groove/first groove
144 blind groove/second groove
150 second eye
200 lid
210 guide edge
212 section of 210
214 gap between 212
220 tab
222 sleeve
230 latching recess
300 clamping member
310 plunger
312 plunger shaft
314 plunger tip
316 ball latch mechanism
320 clamping jaw
322 articulation
324 claw end
326 contact roller
400 hose guide
410 housing insert
412 round bottom groove
414 second clamping member guide groove
500 bolt
510 stop element
520 actuating lever
530 radial projection

What is claimed is:

1. Valve housing for a pinch valve, comprising
a housing body with an upper opening and two opposing side walls, wherein the side walls have respective inner sides, outer sides and upper edges, and laterally bound the opening with the upper edges, wherein the inner sides each carry a longitudinally extending lid guide groove proximate to the respective upper edge, and
a lid with lateral, longitudinally extending guide edges, the lid configured to slidingly mount on the housing body by engagement of the guide edges in the lid guide grooves of the housing body,
wherein the housing body carries on the outer side of one of the side walls a bolt aligned parallel to the lid guide grooves,
wherein the lid carries a guide fixed to a tab projecting over the upper edge of a corresponding one of the side walls of the housing body and aligned coaxially with the bolt, and
wherein the bolt is configured to detachably fix axially to the housing body and the guide is formed as a sleeve which engages around the bolt to form a rotationally and axially movable sliding bearing between the housing body and the lid.

2. Housing according to claim 1,
wherein the guide edges of the lid and the lid guide grooves of the housing body each comprise sections longitudinally spaced apart from one another, which are matched to one another such that in at least one sliding position of the lid, the sections of the guide edges are in intermittent arrangement with the sections of the lid guide grooves of the housing body, the guide edge sections on the one hand and the lid guide groove sections on the other hand being out of engagement with one another.

3. Housing according to claim 1,
wherein the bolt is mounted in two eyes longitudinally spaced from each other on the outer side of the corresponding side wall of the housing body.

4. Housing according to claim 3,
wherein an axial extent of the guide of the lid is less than a longitudinal spacing of the two eyes.

5. Housing according to claim 3,
wherein a first of the eyes comprises a through opening.

6. Housing according to claim 5,
wherein the second eye comprises a blind opening.

7. Housing according to claim 6,
wherein an end of the bolt disposed closest to the second eye and/or the blind opening comprises a stop element configured for spring-biased displacement in an axial direction of the bolt.

8. Housing according to claim 5,
wherein the bolt has a radially extended projection in a region mounting the bolt in the first eye, wherein an inner side of the first eye has a first groove corresponding to the projection which extends in an axial direction of the bolt, and wherein an end face of the first groove facing away from the second eye is open.

9. Housing according to claim 8,
wherein both end faces of the first groove are open, wherein the first eye has a second groove on the inner side of the first eye, wherein the second groove is offset from the first groove, extends in the axial direction of the bolt, and also corresponds to the radial projection of the bolt, and wherein an end face of the second groove that faces the second eye is open and an end face of the second groove facing away from the second eye is closed.

10. Housing according to claim 8,
wherein the bolt comprises a radially projecting actuating lever in an end region disposed axially offset from the first eye in a direction facing away from the second eye.

11. Housing according to claim 1,
wherein the lid and the housing body comprise mutually corresponding elements of a ball head latch mechanism configured to produce, in a closed position of the lid on the housing body, a releasable securing against longitudinal displacement between the lid and the housing body.

\* \* \* \* \*